United States Patent
Duan

(10) Patent No.: US 11,481,229 B2
(45) Date of Patent: Oct. 25, 2022

(54) METHOD FOR APPLICATION PROCESSING, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Yaohui Duan, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 207 days.

(21) Appl. No.: 16/908,011

(22) Filed: Jun. 22, 2020

(65) Prior Publication Data
US 2020/0319900 A1  Oct. 8, 2020

Related U.S. Application Data

(63) Continuation of application No. PCT/CN2018/121809, filed on Dec. 18, 2018.

(30) Foreign Application Priority Data

Feb. 28, 2018  (CN) .......................... 201810167173.0

(51) Int. Cl.
  *G06F 9/445* (2018.01)
  *G06F 8/65* (2018.01)
  *G06N 3/04* (2006.01)

(52) U.S. Cl.
  CPC ............ *G06F 9/44505* (2013.01); *G06F 8/65* (2013.01); *G06N 3/04* (2013.01)

(58) Field of Classification Search
  CPC .......... G06F 9/44505; G06F 8/65; G06N 3/04
  See application file for complete search history.

(56) References Cited

U.S. PATENT DOCUMENTS

| 10,231,033 | B1* | 3/2019 | Bumgarner | ........ H04N 21/4825 |
| 2005/0262500 | A1* | 11/2005 | Stanley | ..................... G06F 8/65 |
| | | | | 717/173 |

(Continued)

FOREIGN PATENT DOCUMENTS

| CN | 101207799 A | 6/2008 |
| CN | 101707648 A | 5/2010 |

(Continued)

OTHER PUBLICATIONS

Indian Examination Report for IN Application 202017023823 dated Aug. 19, 2021. (7 pages).

(Continued)

*Primary Examiner* — Nimesh G Patel
(74) *Attorney, Agent, or Firm* — Young Basile Hanlon & MacFarlane, P.C.

(57) ABSTRACT

A method for application processing, a storage medium, and an electronic device are provided. The method includes: obtaining historical operation information of the electronic device; obtaining triggering probability values of a plurality of applications in an application platform installed in the electronic device based on the historical operation information; selecting an application with a triggering probability value greater than a first preset probability value as a target application; downloading resource files of the target application; buffering the resource files into a storage area corresponding to the application platform; and loading the resource files stored in the storage area and corresponding to the target application, in response to detecting a triggering operation on the target application.

18 Claims, 7 Drawing Sheets

(56) References Cited

U.S. PATENT DOCUMENTS

| | | | | |
|---|---|---|---|---|
| 2012/0324481 | A1* | 12/2012 | Xia | G06F 9/485 |
| | | | | 719/320 |
| 2013/0173513 | A1* | 7/2013 | Chu | G06F 9/451 |
| | | | | 706/14 |
| 2014/0372356 | A1* | 12/2014 | Bilal | G06F 9/44578 |
| | | | | 706/46 |
| 2015/0301817 | A1 | 10/2015 | Jornow et al. | |
| 2016/0170575 | A1 | 6/2016 | Ye et al. | |

FOREIGN PATENT DOCUMENTS

| | | | |
|---|---|---|---|
| CN | 103870470 | A | 6/2014 |
| CN | 104679536 | A | 6/2015 |
| CN | 105068823 | A | 11/2015 |
| CN | 105653655 | A | 6/2016 |
| CN | 105939416 | A | 9/2016 |
| CN | 105991829 | A | 10/2016 |
| CN | 106095768 | A | 11/2016 |
| CN | 106227844 | A | 12/2016 |
| CN | 106777113 | A | 5/2017 |
| CN | 107194770 | A | 9/2017 |
| CN | 107450798 | A | 12/2017 |
| CN | 107451694 | A | 12/2017 |
| CN | 107544898 | A | 1/2018 |
| CN | 107562473 | A | 1/2018 |
| CN | 107728878 | A | 2/2018 |
| CN | 108345478 | A | 7/2018 |

OTHER PUBLICATIONS

English translation of ISR for PCT application PCTCN 2018121809 dated Mar. 18, 2019.
English translation of OA for CN application 201810167173.0 dated Nov. 7, 2019.
English translation of OA for CN application 201810167173.0 dated Jan. 17, 2020.
Extended European Search Report for EP Application 18907535.1 dated Mar. 12, 2021.
Communication pursuant to Article 94(3) EPC for EP Application 18907535.1 dated Nov. 22, 2021. (5 pages).

\* cited by examiner

METHOD FOR APPLICATION PROCESSING, STORAGE MEDIUM, AND ELECTRONIC DEVICE

CROSS-REFERENCE TO RELATED APPLICATION(S)

This is a continuation application of PCT/CN2018/121809, filed on Dec. 18, 2018, which claims priority to Chinese Patent Application No. 201810167173.0, filed on Feb. 28, 2018, the entire contents of which are incorporated herein by reference.

TECHNICAL FIELD

The disclosure relates to the field of electronic device technologies, and more particularly to a method for application processing, a storage medium, and an electronic device.

BACKGROUND

Presently, with the rapid development of terminal technologies, such as smart phones are getting deeper into people's lives, a variety of applications may be installed in the smart phones, such as a photo capturing application, a game application, and a map application, for a user to use.

However, as functions of the applications become more and more powerful, a storage space occupied by each application is also increasing, which may affect a normal operation of a smart phone system.

SUMMARY

In a first aspect, embodiments of the disclosure provide a method for application processing, applied to an electronic device. The method includes: obtaining historical operation information of the electronic device; obtaining triggering probability values of a plurality of applications in an application platform installed in the electronic device based on the historical operation information; selecting an application with a triggering probability value greater than a first preset probability value as a target application; downloading resource files of the target application; buffering the resource files into a storage area corresponding to the application platform; and loading the resource files stored in the storage area and corresponding to the target application, in response to detecting a triggering operation on the target application.

In a second aspect, embodiments of the disclosure provide a storage medium having a computer program stored thereon. An electronic device is caused to execute the above method for application processing when the computer program is operating in the electronic device.

In a third aspect, embodiments of the disclosure provide an electronic device. The electronic device includes a processor and a memory. The memory is configured to store a computer program. The processor is configured to execute the above method for application processing by calling the computer program.

BRIEF DESCRIPTION OF DRAWINGS

In order to clearly illustrate technical solutions in embodiments of the disclosure, a brief description will be made below to accompanying drawings that need to be used in the embodiments. Obviously, the accompanying drawings in the following descriptions are only some embodiments of the disclosure, and for those skilled in the art, other accompanying drawings can be obtained according to these accompanying drawings without creative labor.

DETAILED DESCRIPTION

Figures 1, 2:
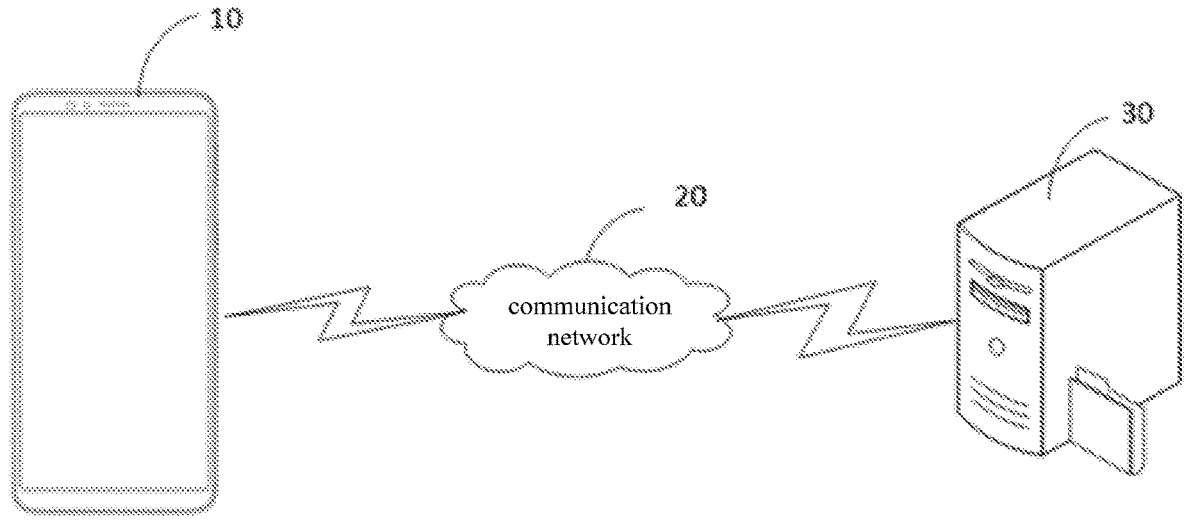
FIG. 1 is a schematic diagram illustrating a scenario of a method for application processing according to embodiments of the disclosure.
FIG. 2 is a flow chart illustrating a method for application processing according to embodiments of the disclosure.

Referring to the accompanying drawings, same reference numerals refer to same elements. The principle of the disclosure is illustrated by an implementation in a suitable computing scenario. The following description is based on the illustrated detailed embodiments of the disclosure, and should not be taken as a limiting to other detailed embodiments not described in detail here.

Embodiments of the disclosure provide a method for application processing, which is applied to an electronic device. The method includes: obtaining historical operation information of the electronic device; obtaining triggering probability values of a plurality of applications in an application platform installed in the electronic device based on the historical operation information; selecting an application with a triggering probability value greater than a first preset probability value as a target application; downloading resource files of the target application; buffering the resource files into a storage area corresponding to the application platform; and loading the resource files stored in the storage area, corresponding to the target application, in response to detecting a triggering operation on the target application.

Obtaining the historical operation information of the electronic device, and obtaining the triggering probability values of the plurality of applications in the application platform installed in the electronic device based on the historical operation information may include: obtaining a triggering time point in response to detecting a triggering operation on the application platform; obtaining historical operation information of the electronic device in a preset period prior to the triggering time point; and inputting the historical operation information into a prediction model, the prediction model for predicting the triggering probability values of the plurality of applications in the application platform based on the historical operation information.

Inputting the historical operation information into the prediction model may include: classifying the historical operation information to obtain first-type information belonging to user interaction information and second-type information belonging to system information of the electronic device; increasing a weight of the first-type information and decreasing a weight of the second-type information; and inputting the first-type information with the increased weight and the second-type information with the decreased weight into the prediction model.

The prediction model includes at least one of: a convolutional neural network model or a recurrent neural network model.

Downloading the resource files of the target application may include: obtaining a data amount of resource files that need to be downloaded for the target application; determining whether a triggering probability value of the target application is greater than a second preset probability value under a case that the data amount is greater than a preset data amount, the second preset probability value being greater than the first preset probability value; downloading all the resource files of the target application under a case that the triggering probability value of the target application is greater than the second preset probability value; and downloading part of the resource files of the target application under a case that the triggering probability value of the target application is not greater than the second preset probability value.

The method may further include: adding an execution entrance of the target application to a main interface of the electronic device under the case that the triggering probability value of the target application is greater than the second preset probability value.

Downloading the resource files of the target application may include: obtaining a pre-storage capacity corresponding to the target application based on the triggering probability value of the target application; obtaining a data amount of resource files that need to be downloaded for the target application; detecting whether the storage area has a residual capacity under a case that the data amount exceeds the pre-storage capacity; determining whether the data amount exceeds a sum of the pre-storage capacity and the residual capacity under a case that there is the residual capacity; and downloading the resource files of the target application under a case that the data amount does not exceed the sum of the pre-storage capacity and the residual capacity.

The method may further include: selecting an application with a triggering probability value not greater than the first preset probability value but greater than a third preset probability value as an alternative application, in which the third preset probability value is smaller than the first preset probability value; adding an execution entrance of the target application to a first preset position of a main interface of the application platform; and adding an execution entrance of the alternative application to a second preset position of the main interface of the application platform.

There are a plurality of target applications and a plurality of alternative applications. The second preset position is set around the first preset position.

There are a plurality of target applications and a plurality of alternative applications. The plurality of target applications and the plurality of alternative applications are displayed in an arrangement of the triggering probability values.

The method also includes: updating the triggering probability value of the target application under a case that the storage area is full; and deleting the resource files of the target application under a case that the updated triggering probability value is smaller than the first preset probability value.

The method also includes: generating and displaying a native interface of the target application based on a configuration file of the target application included in the resource files.

The configuration file includes statements describing the native interface of the target application. The statements include data required for displaying the native interface and an operation logic of the native interface.

Embodiments of the disclosure also provide a storage medium having a computer program stored thereon. An electronic device is caused to execute the method for application processing according to any one embodiment described above when the computer program is operating in the electronic device.

Embodiments of the disclosure also provide an electronic device. The electronic device includes a processor and a memory. The memory has a computer program stored thereon. The processor is coupled to the memory. The processor, by calling the computer program, is configured to execute: obtain historical operation information of the electronic device; obtain triggering probability values of a plurality of applications in an application platform installed in the electronic device based on the historical operation information; select an application with a triggering probability value greater than a first preset probability value as a target application; download resource files of the target application; buffer the resource files into a storage area corresponding to the application platform; and load the resource files stored in the storage area and corresponding to the target application, in response to detecting a triggering operation on the target application.

During obtaining the historical operation information of the electronic device, and obtaining the triggering probability values of the plurality of applications in the application platform based on the historical operation information, the processor is also configured to: obtain a triggering time point in response to detecting a triggering operation on the application platform; obtain historical operation information of the electronic device in a preset period prior to the triggering time point; and input the historical operation information into a prediction model, the prediction model for predicting the triggering probability values of the plurality of applications in the application platform based on the historical operation information.

During inputting the historical operation information into the prediction model, the processor is also configured to: classify the historical operation information to obtain first-type information belonging to user interaction information and second-type information belonging to system information of the electronic device; increase a weight of the first-type information and decrease a weight of the second-type information; and input the first-type information with the increased weight and the second-type information with the decreased weight into the prediction model.

During downloading the resource files of the target application, the processor is also configured to: obtain a data amount of resource files that need to be downloaded for the target application; determine whether a triggering probability value of the target application is greater than a second preset probability value under a case that the data amount is greater than a preset data amount, the second preset probability value being greater than the first preset probability value; download all the resource files of the target application under a case that the triggering probability value of the target application is greater than the second preset probability value; and download part of the resource files of the target application under a case that the triggering probability value of the target application is not greater than the second preset probability value.

During downloading the resource files of the target application, the processor is also configured to: obtain a pre-storage capacity corresponding to the target application based on the triggering probability value of the target application; obtain a data amount of resource files that need to be downloaded for the target application; detect whether the storage area has a residual capacity under a case that the data amount exceeds the pre-storage capacity; determine whether the data amount exceeds a sum of the pre-storage capacity and the residual capacity under a case that there is the residual capacity; and download the resource files of the target application under a case that the data amount does not exceed the sum of the pre-storage capacity and the residual capacity.

The processor is also configured to: select an application with a triggering probability value not greater than the first preset probability value but greater than a third preset probability value as an alternative application, in which the third preset probability value is smaller than the first preset probability value; add an execution entrance of the target application to a first preset position of a main interface of the application platform; and add an execution entrance of the alternative application to a second preset position of the main interface of the application platform.

The method for application processing is provided in embodiments of the disclosure. An executing body of the method for application processing may be an apparatus for application processing according to embodiments of the disclosure, or an electronic device integrated with the apparatus for application processing. The apparatus for application processing may be implemented in form of hardware or software. The electronic device may be a smart phone, a tablet, a palm computer, a notebook computer, a desktop computer, or other device.

Referring to FIG. 1, FIG. 1 is a schematic diagram illustrating a scenario of a method for application processing according to embodiments of the disclosure. As illustrated in FIG. 1, an electronic device 10 is coupled with an application server 30 through a network 20.

The electronic device may be installed with an operating system suitable for hardware of the electronic device based on an actual requirement, such as an android system, an apple system, a windows system and a symbian system.

The network may be a wireless network or a wired network, which may include a network entity such as a router and a gateway, and not be illustrated in FIG. 1. When the network is the wireless network, the network may include one or a combination of a wireless wide area network, a wireless local area network, a wireless metropolitan area network, and a wireless personal network.

The application server stores a configuration file corresponding to an application. When the configuration file is executed by the electronic device, a native interface of the application is generated, that is, a same operation effect for installing a related application is implemented under a premise that the related application is not installed. It should be noted that, in addition to generating the configuration file of the native interface, data required for operating the application may be obtained from the application server in real time. Therefore, the native interface generated by the electronic device executing the configuration file may be popularly called as a "fast application". In addition, the application server, as a "middleman" between a user and a developer of the application, provides an application platform service for the user and the developer. On the one hand, the developer may upload the "fast application" (including the configuration file and other files required for operating the application) developed by the developer to the application server, and provide the "fast application" to the user through the application server. On the other hand, the user may query a "fast application" to be used through the application server based on a requirement of the user, and use the "fast application" quickly.

Referring to FIG. 2, FIG. 2 is a flow chart illustrating a method for application processing according to embodiments of the disclosure. A detailed procedure for the method for application processing according to embodiments of the disclosure may include the following.

At block 201, historical operation information of the electronic device is obtained, and triggering probability values of a plurality of applications in an application platform installed in the electronic device are obtained based on the historical operation information.

The historical operation information of the electronic device may include a chat record, input information, network browsing information, etc. of the user, and may also include a system time, a remaining power, a current network state (e.g., a WIFI state or a mobile network state), a network quality, an operation duration after the electronic device is powered on, a latest screen rest time, a background application, etc.

The application platform refers to a platform that aggregates execution entrances of a plurality of fast applications in the electronic device, and the execution entrances of different fast applications may be clicked on the application platform, thereby entering a native page of the corresponding fast application. The fast application does not need to be installed, but is operating through the application platform.

The triggering probability values of the plurality of applications in the application platform are obtained based on the historical operation information.

In an implementation, obtaining the historical operation information of the electronic device, and obtaining the triggering probability values of the plurality of applications in the application platform based on the historical operation information include: obtaining a triggering time point in response to detecting a triggering operation on the application platform; obtaining historical operation information of the electronic device in a preset period prior to the triggering time point; and inputting the historical operation information into a prediction model, the prediction model for predicting the triggering probability values of the plurality of applications in the application platform based on the historical operation information.

Firstly, a reference time point is obtained, such as the triggering time point at which the application platform is triggered. Then, the historical operation information of the electronic device in the preset period prior to the triggering time point is obtained. The triggering probability value of the application may be predicted more accurately based on the historical operation information in the preset period. Finally, the historical operation information in the preset period is inputted into the prediction model. The prediction model performs prediction, to obtain the triggering probability values of the plurality of applications in the application platform.

The prediction model may be a convolution neural network model, a circulation neural network model, or the like.

The more comprehensive and accurate input data, the more accurate a later prediction result may be.

In an implementation, inputting the historical operation information into the prediction model includes: classifying the historical operation information to obtain first-type information belonging to user interaction information and second-type information belonging to system information of the electronic device; increasing a weight of the first-type information and decreasing a weight of the second-type information; and inputting the first-type information with the increased weight and the second-type information with the decreased weight into the prediction model.

Before the historical operation information is inputted into the prediction model, the historical operation information is classified firstly, and the historical operation information may be classified into the first-type information belonging to the user interaction information and the second-type information belonging to the system information of the electronic device. The first-type information may include chat record information, user input information, user browsing webpage information, etc. The first-type information is strongly related to the user, and the weight of the first-type information may be correspondingly increased, to improve an impact on the prediction result. The second-type information may include a system time, a current network state, a network quality, and an operation time of the electronic device after powered on. A correlation between the second-type information and the user is low, and the weight of the second-type information may be decreased, to reduce the impact on the prediction result. The historical operation information is classified, and the weights of different types of information are adjusted, to improve the accuracy of the prediction result.

At block 202, an application with a triggering probability value greater than a first preset probability value is selected as a target application.

Figure 3:
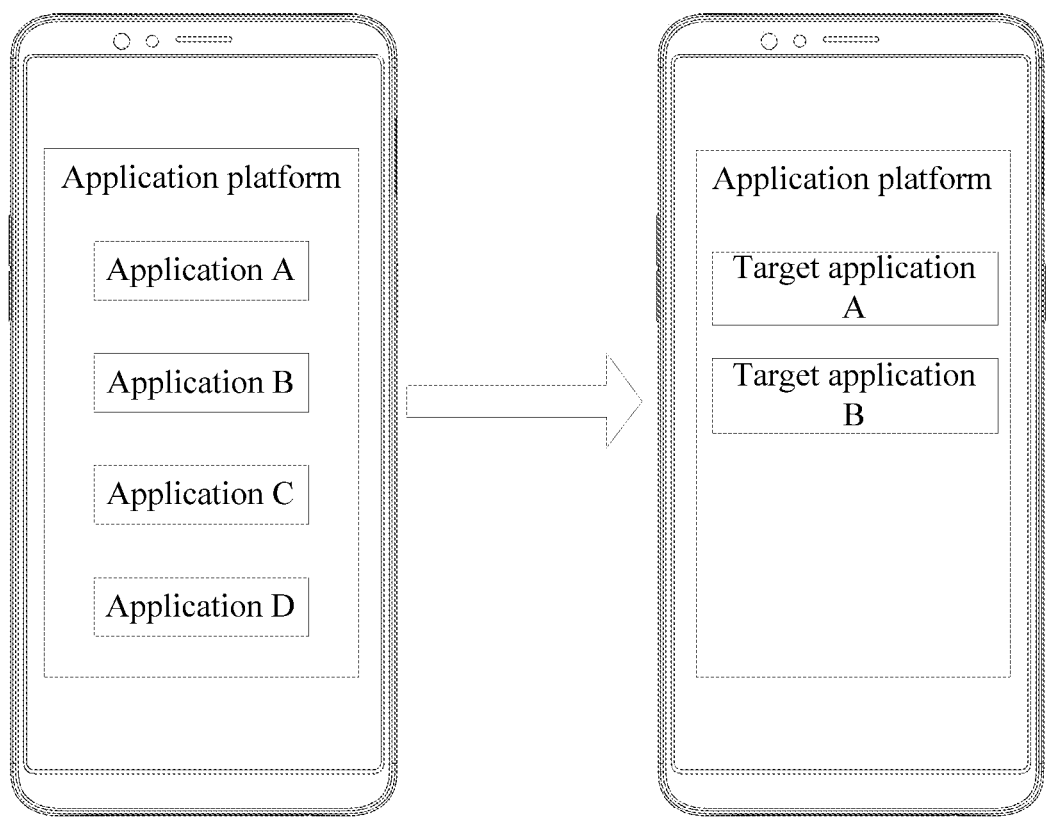
FIG. 3 is a schematic diagram illustrating a scenario for obtaining a target application according to embodiments of the disclosure.

A fixed first preset probability value, such as 0.6, may be preset. After the triggering probability values of the plurality of applications are obtained, the triggering probability value of each application is compared with the first preset probability value. When the triggering probability value is greater than the first preset probability value, the application is selected as the target application. Referring to FIG. 3, the application platform includes an application A, an application B, an application C and an application D. The application A and the application B with the triggering probability value greater than the first preset probability value are selected as the target applications.

The first preset probability value may also be a floating probability value. For example, when the triggering probability values of the plurality of applications are sorted based on sizes of the triggering probability values, and there is a need to select five applications as the target applications, the sixth triggering probability value is selected as the first preset probability value, thereby obtaining the five applications with the larger triggering probability values as the target applications.

In an implementation, the method also includes: selecting an application with a triggering probability value not greater than the first preset probability value but greater than a third preset probability value as an alternative application, in which, the third preset probability value is smaller than the first preset probability value; adding an execution entrance of the target application to a first preset position of a main interface of the application platform; and adding an execution entrance of the alternative application to a second preset position of the main interface of the application platform.

Figure 4:
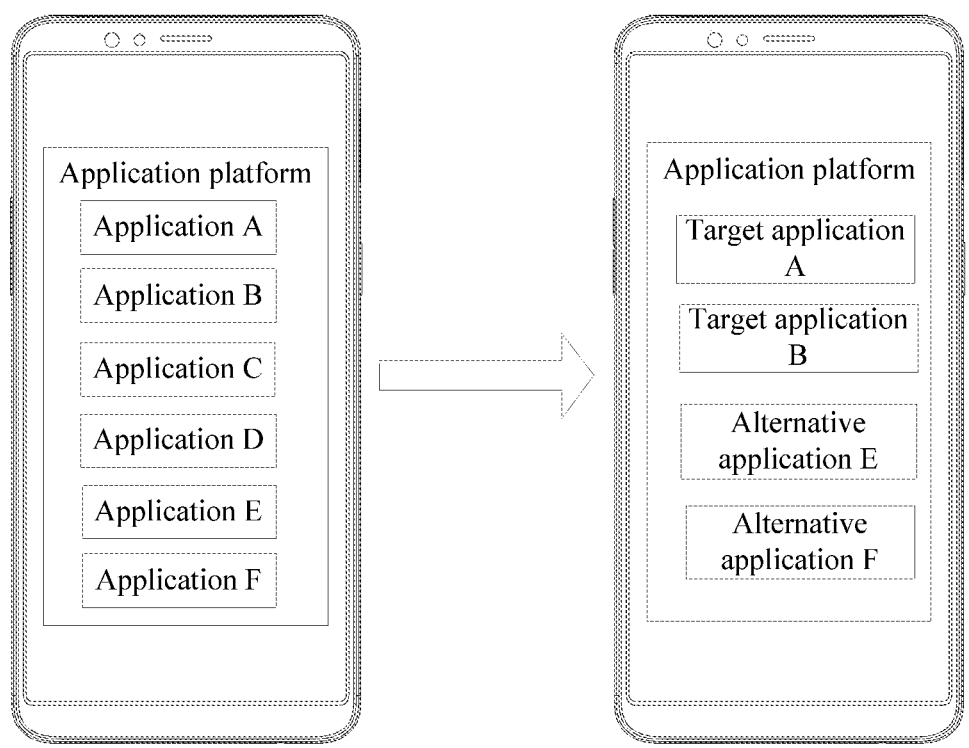
FIG. 4 is a schematic diagram illustrating a scenario for obtaining a target application and an alternative application according to embodiments of the disclosure.

There are a plurality of target applications and a plurality of alternative applications. The execution entrances of the plurality of applications are displayed in the application platform. The target application with the triggering probability value larger than the first preset probability value is displayed at the first preset position, and the alternative application with the smaller triggering probability value is displayed at the second preset position. The first preset position is a more prominent position, and the second preset position is a less prominent position. When the first preset position is the middle, the second preset position is the periphery. The second preset position may surround the first preset position. When the target application and the alternative application are displayed in an arrangement, the target application is displayed in the front, and the alternative application is displayed in the back. Referring to FIG. 4, the application platform includes an application A, an application B, an application C, an application D, an application E and an application F. A target application A, a target application B, an alternative application E and an alternative application F are obtained based on the triggering probability values, and arranged based on the triggering probability values.

In addition, the execution entrance of the target application may be added with other marker, such as added with a background color of other color, an underline, etc.

At block 203, resource files of the target application are downloaded, and the resource files are buffered into a storage area corresponding to the application platform.

The resource files may include a configuration file of the target application or the like.

The configuration file corresponding to the target application is a configuration file of a fast application corresponding to the target application. The configuration file is configured for the electronic device to generate and to display the native interface of the target application, such that the electronic device may implement a same operation effect of the installed target application without installing the target application.

In detail, the configuration file includes statements describing the native interface of the target application, and the statements include data required for displaying the native interface and an operation logic of the native interface.

The data required for displaying the native interface may include display elements that the target application interface needs to display, layout information of the display elements, a resource address required for displaying each display element, and the like. The layout information may include information such as a position, a size, a color, etc. of each display element. The resource address may be an address of a local resource of the electronic device or a link address of a resource stored on the application server.

The operation logic of the native interface may include an interface address that needs to be jumped when the display element is clicked, an operation that needs to be executed when the display element is clicked, or operation that needs to be executed and corresponds to the operation of other user.

The resource files may also include a file of a subdirectory in the application, such as movie header image data of a certain movie in a video application.

After the target application is obtained, the resource files of each target application may be downloaded. The resource files may be buffered into the storage area corresponding to the application platform. The storage area corresponding to the application platform may be a storage area designated by the electronic device for the application platform.

In an implementation, downloading the resource files of the target application includes: obtaining a data amount of resource files that need to be downloaded for the target application; determining whether a triggering probability value of the target application is greater than a second preset probability value under a case that the data amount is greater than a preset data amount, the second preset probability value being greater than the first preset probability value; downloading all the resource files of the target application under a case that the triggering probability value of the target application is greater than the second preset probability value; and downloading part of the resource files of the target application under a case that the triggering probability value of the target application is not greater than the second preset probability value.

The application platform sets a preset data amount corresponding to the target application in advance. Before the resource files of the target application are downloaded, the data amount of the resource files that need to be downloaded for the target application are obtained firstly. And then it is determined whether the data amount is greater than the preset data amount. When the data amount is less than or equal to the preset data amount, the resource files of the target application are directly downloaded. When the data amount is greater than the preset data amount, the resource files that need to be downloaded are larger, which may affect a downloading rate and operation efficiency of the electronic device, as well as a downloading rate of other target application. In this case, it is also determined whether the triggering probability value of the target application is greater than the second preset probability value. The second preset probability value is greater than the first preset probability value. For example, the first preset probability value is 0.6, and the second preset probability value is 0.8. When the triggering probability value of the target application is greater than the second preset probability value, there is a large possibility for triggering the target application, and there is also a large possibility for subsequently downloading the resource files. Therefore, the resource files may be downloaded currently. When the triggering probability value of the target application is not greater than the second preset probability value, a downloading amount of the target application is limited, and the part of the resource files of the target application are merely downloaded, thereby reducing a storage space, and reducing the effect on other target application.

In an implementation, the method further includes: adding an execution entrance of the target application to a main interface of the electronic device under the case that the triggering probability value of the target application is greater than the second preset probability value.

When the triggering probability value of the target application is greater than the second preset probability value, there is a large possibility for triggering the target application. Therefore, the execution entrance of the target application is added to the main interface of the electronic device, such that the user may enter the target application quickly. The execution entrance may be displayed as a triggering icon. When the triggering icon is clicked, the target application loads the resource files for a normal use of the user.

In an implementation, downloading the resource files of the target application includes: obtaining a pre-storage capacity corresponding to the target application based on the triggering probability value of the target application; obtaining a data amount of resource files that need to be downloaded for the target application; detecting whether the storage area has a residual capacity under a case that the data amount exceeds the pre-storage capacity; determining whether the data amount exceeds a sum of the pre-storage capacity and the residual capacity under a case that there is the residual capacity; and downloading the resource files of the target application under a case that the data amount does not exceed the sum of the pre-storage capacity and the residual capacity.

The storage space of the target application may be pre-allocated. For example, when five target applications are set, and the storage space is 1M, the storage space (i.e., 1M) may be allocated equally for the target applications may, and may also be allocated based on a decreasing order of the triggering probability values. The pre-storage capacity corresponding to the target application, and the data amount of the resource files that need to be downloaded for the target application are obtained. Then, the pre-storage capacity is compared with the data amount. When the data amount does not exceed the pre-storage capacity, the resource files are downloaded directly. When the data amount exceeds the pre-storage capacity, it is detected whether the storage area has the residual capacity. When the storage area has the residual capacity, it is determined whether the data amount exceeds the sum of the pre-storage capacity and the residual capacity. When the data amount does not exceed the sum of the pre-storage capacity and the residual capacity, the resource files of the target application are downloaded.

When the storage area does not have the residual capacity, the part of the resource files is downloaded. When the data amount exceeds the sum of the pre-storage capacity and the residual capacity, the part of the resource files is downloaded.

The target application with a larger triggering probability value may be downloaded preferentially. When the data amounts of two target applications exceed the pre-storage capacity, the target application with the larger triggering probability value may be preferentially satisfied.

At block 204, the resource files stored in the storage area and corresponding to the target application are loaded in response to detecting a triggering operation on the target application.

Figure 5:
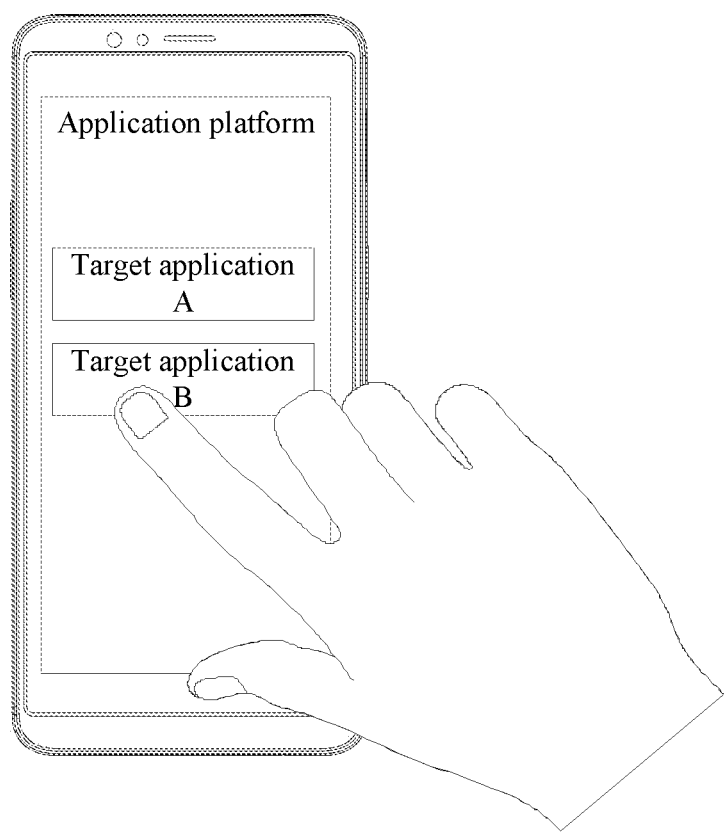
FIG. 5 is a schematic diagram illustrating a scenario where a user triggers a target application according to embodiments of the disclosure.

When the triggering operation on the target application is detected, there is no need to download the resource files of the target application in large quantities from the network, and the resource files are directly loaded from the storage area, such that the configuration may be completed quickly, and launching the target application may be accelerated. Referring to FIG. 5, a target application B is triggered by the user, and the resource files of the target application B stored in the storage area are loaded.

In an implementation, after the resource files of the target application are downloaded, and the resource files are buffered into the storage area corresponding to the application platform, the method further includes: updating the triggering probability value of the target application under a case that the storage area is full; and deleting the resource files of the target application under a case that the updated triggering probability value is smaller than the first preset probability value.

When the storage area is full, the triggering probability value of the target application is reacquired, which starts from the target application with a smaller triggering probability value. When the triggering probability value of the target application is smaller than the first preset probability value, the resource files buffered by the target application are deleted, thereby saving the storage space.

When the storage area is full, the triggering probability values of all the applications in the application platform may also be reacquired, and a batch of target applications are reacquired. When the target application obtained before is not the reacquired target application, the resource files corresponding to the target application obtained before are deleted, a new target application is added, and the resource files of the reacquired target application are downloaded. When both the target application obtained before and the target application obtained currently are the same target application, it is determined whether the resource files of the target application are expired or invalid. When the resource files are expired or invalid, the resource files are downloaded again.

Figure 6:
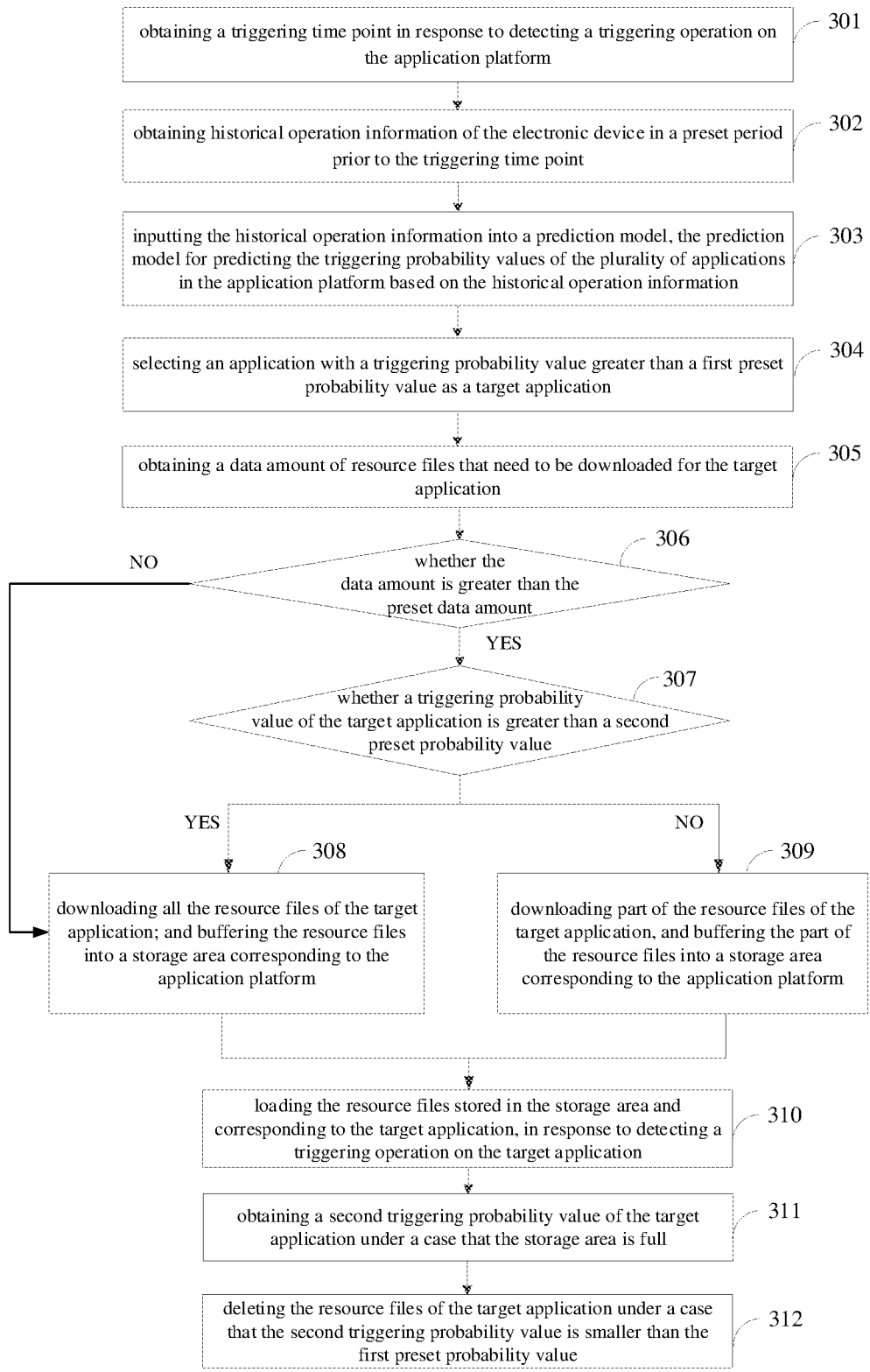
FIG. 6 is another flow chart illustrating a method for application processing according to embodiments of the disclosure.

Referring to FIG. 6, FIG. 6 is another flow chart illustrating a method for application processing according to embodiments of the disclosure. A detailed procedure of the method for application processing according to this embodiment of the disclosure may include the following.

At block 301, a triggering time point is obtained in response to detecting a triggering operation on the application platform.

A reference time point is obtained firstly, such as the triggering time point at which the application platform is triggered.

At block 302, historical operation information of the electronic device in a preset period prior to the triggering time point is obtained.

Then, the historical operation information in the preset period prior to the triggering time point is obtained. The triggering probability value of the application may be predicted more accurately based on the historical operation information in the preset period. The historical operation information of the electronic device may include chat record, input information, network browsing information, etc. of the user, and may also include a system time, a remaining power, a current network state (e.g., a WIFI state or a mobile network state), a network quality, an operation duration after the electronic device is powered on, a latest screen rest time, a background application, etc.

At block 303, the historical operation information is input into a prediction model, and the prediction model is configured to predict triggering probability values of a plurality of applications in the application platform based on the historical operation information.

Then, the historical operation information in the preset period prior to the triggering time point is obtained. The triggering probability value of the application may be predicted more accurately based on the historical operation information in the preset period. Finally, the historical operation information in the preset period is input into the prediction model. The prediction model performs prediction, to obtain the triggering probability values of the plurality of applications.

The prediction model may be a convolutional neural network model and a recurrent neural network model. The more comprehensive and accurate input data, the more accurate a prediction result may be.

At block 304, an application with a triggering probability value greater than a first preset probability value is selected as a target application.

A fixed first preset probability value, such as 0.6, may be preset. After the triggering probability values of the plurality of applications are obtained, the triggering probability value of each application is compared with the first preset probability value. When the triggering probability value of the application is greater than the first preset probability value, the application is selected as the target application.

The first preset probability value may also be a floating probability value. For example, when the triggering probability values of the plurality of applications are sorted based on sizes of the triggering probability values, and there is a need to select five applications as the target applications, the sixth triggering probability value is selected as the first preset probability value, thereby obtaining the five applications with the larger triggering probability values as the target applications.

At block 305, a data amount of resource files that need to be downloaded for the target application is obtained.

Before the resource files of the target application are downloaded, the data amount of resource files that need to be downloaded for the target application is obtained firstly.

At block 306, it is determined whether that the data amount is greater than the preset data amount.

At block 307, it is determined whether a triggering probability value of the target application is greater than a second preset probability value under a case that the data amount is greater than a preset data amount, the second preset probability value being greater than the first preset probability value.

The application platform sets a preset data amount in advance for the target application.

At block 308, all the resource files of the target application are downloaded under a case that the triggering probability value of the target application is greater than the second preset probability value, and the resource files are buffered in a storage area corresponding to the application platform.

When the data amount is greater than the preset data amount, the resource files that need to be downloaded are larger, which may affect a downloading rate and an operation efficiency of the electronic device, as well as a downloading rate of other target application. In this case, it is also determined whether the triggering probability value of the target application is greater than the second preset probability value. The second preset probability value is greater than the first preset probability value. For example, the first preset probability value is 0.6, and the second preset probability value is 0.8. When the triggering probability value of the target application is greater than the second preset probability value, there is a large possibility for triggering the target application, and there is also a large possibility for subsequently downloading the resource files. Therefore, the resource files may be downloaded currently. When the triggering probability value of the target application is not greater than the second preset probability value, a downloading amount of the target application is limited, and the part of the resource files of the target application are merely downloaded, thereby reducing a storage space, and reducing the effect on other target application.

At block 309, the part of the resource files of the target application are downloaded under a case that the triggering probability value of the target application is not greater than the second preset probability value.

When the data amount is lower than or equal to the preset data amount, the resource files of the target application are downloaded directly.

At block 310, the resource files stored in the storage area and corresponding to the target application are loaded in response to detecting a triggering operation on the target application.

When the triggering operation on the target application is detected, there is no need to download the resource files of the target application in large quantities from the network, and the resource files are directly loaded from the storage area, such that the configuration may be completed quickly, and launching the target application may be accelerated.

At block 311, the triggering probability value of the target application is updated under a case that the storage area is full.

When the storage area is full, the triggering probability value of the target application is reacquired, which may start from the target application with a smallest triggering probability value. Or, when the storage area is full, triggering probability values of all the applications in the application platform may also be reacquired.

At block 312, the resource files of the target application are deleted under a case that the updated triggering probability value is smaller than the first preset probability value.

When the triggering probability value is reacquired from the target application with the smallest triggering probability value, the resource files of the target application are deleted under the case that the triggering probability value is smaller than the first preset probability value, thereby saving the storage space. Under the case that the triggering probability values of all the applications in the application platform may be reacquired, and a batch of target applications are reacquired, when the target application obtained before is not the target application obtained currently, the resource files corresponding to the target application obtained before are deleted, a new target application is added, and the resource files of the target application obtained currently are downloaded. When both the target application obtained before and the target application obtained currently are the same target application, it is determined whether the resource files of the target application are expired or invalid. When the resource files are expired or invalid, the resource files are downloaded again.

It may be known above that, with this embodiment, the historical operation information of the electronic device is obtained, and the triggering probability values of the plurality of applications in the application platform are obtained based on the historical operation information; the application with the triggering probability value greater than the first preset probability value is set as the target application, to obtain the at least one target application; the resource files of the target application are downloaded, and the resource files are buffered into the storage area corresponding to the application platform; and the resource files stored in the storage area and corresponding to the target application are loaded in response to detecting the triggering operation on the target application. The triggering probability value of the application is predicted before the application is triggered. When the triggering probability value of the application is greater than the first preset probability value, the resource files are buffered. When the application is triggered, the buffered resource files may be loaded, and there is no need to download the resource files temporarily, which may improve a launching speed of the application.

Figure 7:
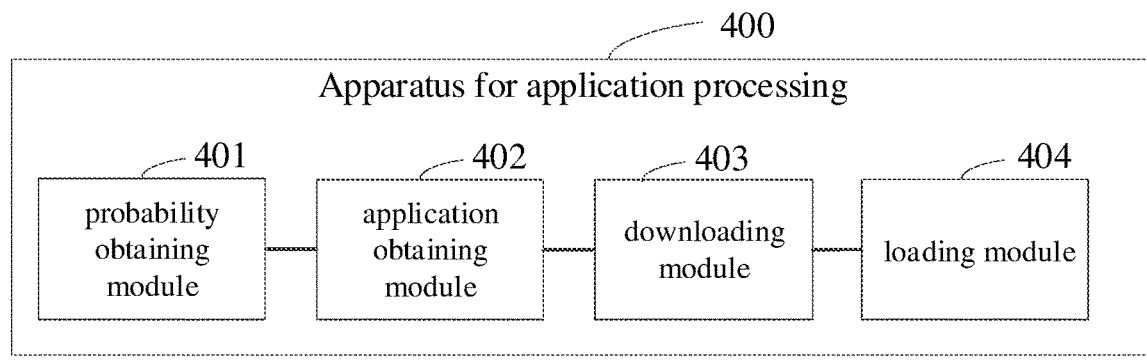
FIG. 7 is a block diagram illustrating an apparatus for application processing according to embodiments of the disclosure.

In an embodiment, an apparatus for application processing may be also provided. Referring to FIG. 7, FIG. 7 is a block diagram illustrating an apparatus for application processing according to embodiments of the disclosure. The apparatus 400 for application processing is applied to an electronic device. The apparatus 400 for application processing includes a probability obtaining module 401, an application obtaining module 402, a downloading module 403 and a loading module 404.

The probability obtaining module 401 is configured to: obtain historical operation information of the electronic device, and obtain triggering probability values of a plurality of applications in an application platform installed in the electronic device based on the historical operation information.

The application obtaining module 402 is configured to select an application with a triggering probability value greater than a first preset probability value as a target application.

The downloading module 403 is configured to: download resource files of the target application, and buffer the resource files into a storage area corresponding to the application platform.

The loading module 404 is configured to: load the resource files stored in the storage area and corresponding to the target application, in response to detecting a triggering operation on the target application.

Figure 8:
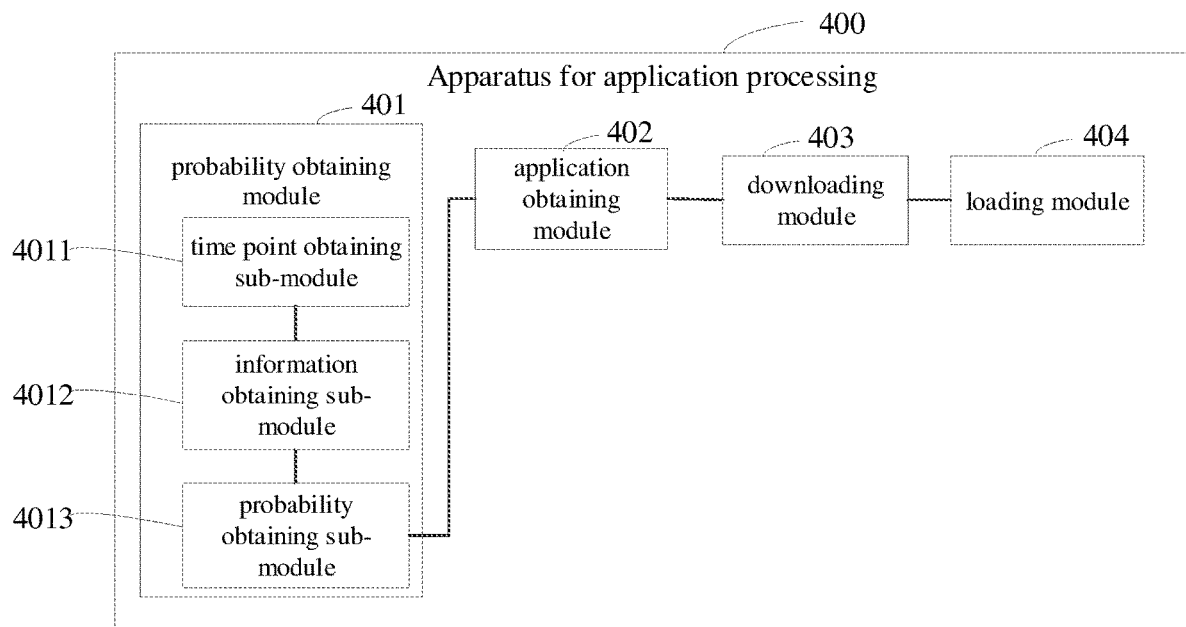
FIG. 8 is another block diagram illustrating an apparatus for application processing according to embodiments of the disclosure.

In an embodiment, referring to FIG. 8, FIG. 8 is another block diagram illustrating an apparatus for application processing according to embodiments of the disclosure. The probability obtaining module 401 includes a time point obtaining sub-module 4011, an information obtaining sub-module 4012 and a probability obtaining sub-module 4013.

The time point obtaining sub-module 4011 is configured to obtain a triggering time point in response to detecting a triggering operation on the application platform.

The information obtaining sub-module 4012 is configured to obtain historical operation information of the electronic device in a preset period prior to the triggering time point.

The probability obtaining sub-module 4013 is configured to input the historical operation information into a prediction model, the prediction model for predicting the triggering probability values of the plurality of applications in the application platform based on the historical operation information.

In an embodiment, the probability obtaining module 401 is also configured to: classify the historical operation information to obtain first-type information belonging to user interaction information and second-type information belonging to system information of the electronic device; increase a weight of the first-type information and decrease a weight of the second-type information; and input the first-type information with the increased weight and the second-type information with the decreased weight into the prediction model.

In an embodiment, the downloading module 403 is also configured to: obtain a data amount of resource files that need to be downloaded for the target application; determine whether a triggering probability value of the target application is greater than a second preset probability value under a case that the data amount is greater than a preset data amount, the second preset probability value being greater than the first preset probability value; download all the resource files of the target application under a case that the triggering probability value of the target application is greater than the second preset probability value; and download part of the resource files of the target application under a case that the triggering probability value of the target application is not greater than the second preset probability value.

In an embodiment, the apparatus also includes an adding module. The adding module is configured to: add an execution entrance of the target application to a main interface of the electronic device under the case that the triggering probability value of the target application is greater than the second preset probability value.

In an embodiment, the downloading module 403 is also configured to: obtain a pre-storage capacity corresponding to the target application based on the triggering probability value of the target application; obtain a data amount of resource files that need to be downloaded for the target application; detect whether the storage area has a residual capacity under a case that the data amount exceeds the pre-storage capacity; determine whether the data amount exceeds a sum of the pre-storage capacity and the residual capacity under a case that there is the residual capacity; and download the resource files of the target application under a case that the data amount does not exceed the sum of the pre-storage capacity and the residual capacity.

In an embodiment, the application obtaining module 402 is also configured to: select an application with a triggering probability value not greater than the first preset probability value but greater than a third preset probability value as an alternative application, in which the third preset probability value is smaller than the first preset probability value; add an execution entrance of the target application to a first preset position of a main interface of the application platform; and add an execution entrance of the alternative application to a second preset position of the main interface of the application platform.

In an embodiment, the apparatus also includes a deleting module. The deleting module is configured to: update the triggering probability value of the target application under a case that the storage area is full; and delete the resource files of the target application under a case that the updated triggering probability value is smaller than the first preset probability value.

It may be known above that, with this embodiment, the probability obtaining module obtains the historical operation information of the electronic device, and obtains the triggering probability values of the plurality of applications in the application platform based on the historical operation information; the application obtaining module sets the application with the triggering probability value greater than the first preset probability value as the target application to obtain the at least one target application; the downloading module downloads the resource files of the target application, and buffers the resource files into the storage area corresponding to the application platform; and the loading module loads the resource files stored in the storage area and corresponding to the target application, in response to detecting the triggering operation on the target application. The triggering probability value of the application is predicted before the application is triggered. When the triggering probability value of the application is greater than the first preset probability value, the resource files are buffered. When the application is triggered, the buffered resource files may be loaded, and there is no need to download the resource files temporarily, which may improve a starting-up speed of the application.

Figure 9:
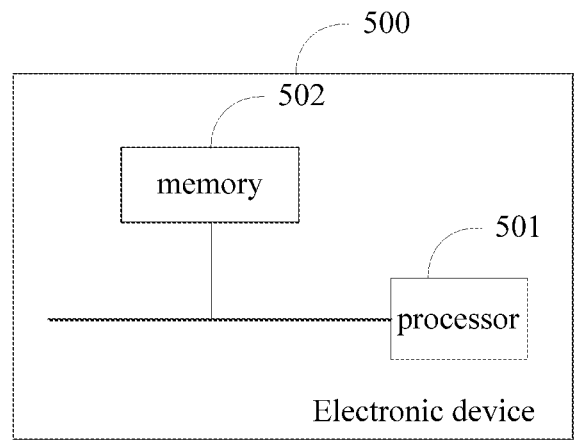
FIG. 9 is a block diagram illustrating an electronic device according to embodiments of the disclosure.

Embodiments of the disclosure also provide an electronic device. Referring to FIG. 9, the electronic device 500 includes a processor 501 and a memory 502. The processor 501 is coupled to the memory 502 electrically.

The processor 500 is a control center of the electronic device 500. Various interfaces and circuits are used to couple various parts of the entire electronic device. By operating or loading a computer program stored in the memory 502 and calling data stored in the memory 502, various functions of the electronic device 500 are executed and data are processed, thereby implementing automatic change for material information of the electronic device.

The memory 502 may be configured to store software programs and modules. The processor 501 is configured to execute various functional applications and data processing by operating the computer programs and modules stored in the memory 502. The memory 502 may mainly include a storage program area and a storage data area. The storage program area may store an operating system, computer programs required for at least one function (such as a sound playing function, an image playing function, etc.) and the like. The storage data area may store data or the like created based on the use of the electronic device. In addition, the memory 502 may include a high-speed random-access memory, and may also include a non-volatile memory, such as at least one of: a disk memory device, a flash memory device, or other volatile solid-state memory device. Accordingly, the memory 502 may also include a memory controller to provide access to the memory 502 by the processor 501.

In this embodiment of the disclosure, the processor 501 of the electronic device 500 may load instructions corresponding to processes of one or more computer programs into the memory 502 based on the following actions, and the computer programs stored in the memory 502 are executed by the processor 501, thereby implementing various functions. The actions include: obtaining historical operation information of the electronic device, and obtaining triggering probability values of a plurality of applications in an application platform installed in the electronic device based on the historical operation information; selecting an application with a triggering probability value greater than a first preset probability value as a target application; downloading resource files of the target application, and buffering the resource files into a storage area corresponding to the application platform; and loading the resource files stored in the storage area and corresponding to the target application, in response to detecting a triggering operation on the target application.

In some implementation, during obtaining the historical operation information of the electronic device, and obtaining the triggering probability values of the plurality of applications in the application platform based on the historical operation information, the processor 501 may be further configured to: obtain a triggering time point in response to detecting a triggering operation on the application platform; obtain historical operation information of the electronic device in a preset period prior to the triggering time point; and input the historical operation information into a prediction model, the prediction model for predicting the triggering probability values of the plurality of applications in the application platform based on the historical operation information.

In some embodiments, during inputting the historical operation information into the prediction model, the processor 501 may be also configured to: classify the historical operation information to obtain first-type information belonging to user interaction information and second-type information belonging to system information of the electronic device; increase a weight of the first-type information and decrease a weight of the second-type information; and input the first-type information with the increased weight and the second-type information with the decreased weight into the prediction model.

In some embodiments, during downloading the resource files of the target application, the processor 501 may be also configured to: obtain a data amount of resource files that need to be downloaded for the target application; determine whether a triggering probability value of the target application is greater than a second preset probability value under a case that the data amount is greater than a preset data amount, the second preset probability value being greater than the first preset probability value; download all the resource files of the target application under a case that the triggering probability value of the target application is greater than the second preset probability value; and download part of the resource files of the target application under a case that the triggering probability value of the target application is not greater than the second preset probability value.

In some embodiments, the processor 501 may be configured to: add an execution entrance of the target application to a main interface of the electronic device under the case that the triggering probability value of the target application is greater than the second preset probability value.

In some embodiments, during downloading the resource files of the target application, the processor 501 may be configured to: obtain a pre-storage capacity corresponding to the target application based on the triggering probability value of the target application; obtain a data amount of resource files that need to be downloaded for the target application; detect whether the storage area has a residual capacity under a case that the data amount exceeds the pre-storage capacity; determine whether the data amount exceeds a sum of the pre-storage capacity and the residual capacity under a case that there is the residual capacity; and download the resource files of the target application under a case that the data amount does not exceed the sum of the pre-storage capacity and the residual capacity.

In some embodiments, the processor 501 may be configured to: select an application with a triggering probability value not greater than the first preset probability value but greater than a third preset probability value as an alternative application, in which the third preset probability value is smaller than the first preset probability value; add an execution entrance of the target application to a first preset position of a main interface of the application platform; and add an execution entrance of the alternative application to a second preset position of the main interface of the application platform.

In some embodiments, the processor 501 may be configured to: updated the triggering probability value of the target application under a case that the storage area is full; and delete the resource files of the target application under a case that the updated triggering probability value is smaller than the first preset probability value.

It may be known above that, with this embodiment of the disclosure, the historical operation information of the electronic device is obtained, and the triggering probability values of the plurality of applications in the application platform are obtained based on the historical operation information; the application with the triggering probability value greater than the first preset probability value is set as the target application, to obtain the at least one target application; the resource files of the target application are downloaded, and the resource files are buffered into the storage area corresponding to the application platform; and the resource files stored in the storage area and corresponding to the target application are loaded in response to detecting the triggering operation on the target application. The triggering probability value of the application is predicted before the application is triggered. When the triggering probability value of the application is greater than the first preset probability value, the resource files are buffered. When the application is triggered, the buffered resource files may be loaded, and there is no need to download the resource files temporarily, which may improve a launching speed of the application.

Figure 10:
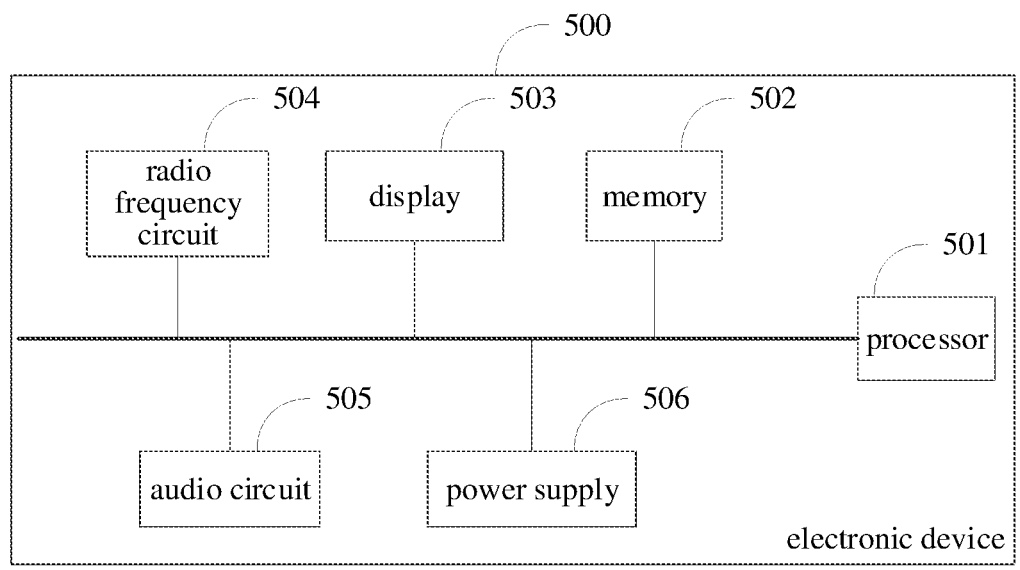
FIG. 10 is another block diagram illustrating an electronic device according to embodiments of the disclosure.

Referring to FIG. 10, in some embodiments, the electronic device 500 may also include: a display 503, a radio frequency circuit 504, an audio circuit 505, and a power supply 506. The display 503, the radio frequency circuit 504, the audio circuit 505, and the power supply 506 are respectively coupled to the processor 501 electrically.

The display 503 may be configured to display information input by a user or information provided to the user, and various graphical user interfaces. These graphical user interfaces may include graphics, text, icons, videos, and any combination thereof. The display 503 may include a display panel. In some embodiments, the display panel may be configured in the form of a liquid crystal display (LCD), an organic light-emitting diode (OLED), or the like.

The radio frequency circuit 504 may be configured to transmit and receive radio frequency signals to establish a wireless communication with a network device or other electronic device through the wireless communication, and to transmit and receive signals with the network device or other electronic device.

The audio circuit 505 may be configured to provide an audio interface between the user and the electronic device through a speaker and a microphone.

The power supply 506 may be configured to supply power to various components of the electronic device 500. In some embodiments, the power supply 506 may be logically coupled to the processor 501 through a power management system, thereby implementing to manage charging, discharging, and power consumption management through the power management system.

Although not illustrated in FIG. 10, the electronic device 500 may also include a camera, a Bluetooth module, etc., which will not be described here.

Embodiments of the disclosure also provide a storage medium. The storage medium has a computer program stored thereon. When the computer program is operating in an electronic device, the electronic device is caused to execute the method for application processing according to any one of the above embodiments. In this embodiment of the disclosure, the storage medium may be a magnetic disk, an optical disk, a read only memory (ROM), or a random-access memory (RAM), etc.

In the above embodiments, the description for each embodiment has its emphasis. For parts not described in detail in one embodiment, please refer to the related description for other embodiments.

It should be noted that, for the method for application processing according to embodiments of the disclosure, ordinary testers in the art may understand that all or part of the flows of the method for application processing according to embodiments of the disclosure may be completed by the computer program controlling relevant hardware. The computer program may be stored in a computer readable storage medium, such as the memory of the electronic device, and executed by at least one processor in the electronic device. The execution process may include, such as, a flow of any embodiment of the method for application processing. The storage medium may be a magnetic disk, an optical disk, a read-only memory, a random-access memory, etc.

For the apparatus for application processing according to embodiments of the disclosure, respective functional modules may be integrated into one processing chip, or exist separately physically, or two or more modules may be integrated into one module. The above integrated modules may be implemented in the form of hardware or software functional modules. If the integrated modules are implemented in the form of software functional modules, and sold or used as an independent product, the integrated modules may also be stored in the computer readable storage medium, such as read-only memory, magnetic disk or optical disk.

The method and apparatus for application processing, the storage medium and the electronic device according to embodiments of the disclosure are described in detail above. In the disclosure, detailed examples are applied to explain the principle and the implementations of the disclosure. The description of the above embodiments is only used to help understand the method and the core ideas of the disclosure. Meanwhile, for those skilled in the art, based on the idea of the disclosure, any change may be made in the detailed implementation and the application scope. In conclusion, the contents of the disclosure should not be construed as limiting the disclosure.

What is claimed is:

1. A method for application processing, applied to an electronic device, and the method comprising:
   obtaining historical operation information of the electronic device;
   obtaining triggering probability values of a plurality of applications in an application platform installed in the electronic device based on the historical operation information;
   selecting an application with a triggering probability value greater than a first preset probability value as a target application;
   downloading resource files of the target application;
   buffering the resource files into a storage area corresponding to the application platform;
   loading the resource files stored in the storage area and corresponding to the target application, in response to detecting a triggering operation on the target application;
   selecting an application with a triggering probability value not greater than the first preset probability value but greater than a third preset probability value as an alternative application, wherein the third preset probability value is smaller than the first preset probability value;
   adding an execution entrance of the target application to a first preset position of a main interface of the application platform; and
   adding an execution entrance of the alternative application to a second preset position of the main interface of the application platform.

2. The method of claim 1, wherein obtaining the historical operation information of the electronic device, and obtaining the triggering probability values of the plurality of applications in the application platform installed in the electronic device based on the historical operation information comprise:
   obtaining a triggering time point in response to detecting a triggering operation on the application platform;
   obtaining historical operation information of the electronic device in a preset period prior to the triggering time point; and
   inputting the historical operation information into a prediction model, the prediction model for predicting the triggering probability values of the plurality of applications in the application platform based on the historical operation information.

3. The method of claim 2, wherein inputting the historical operation information into the prediction model comprises:
   classifying the historical operation information to obtain first-type information belonging to user interaction information and second-type information belonging to system information of the electronic device;
   increasing a weight of the first-type information and decreasing a weight of the second-type information; and
   inputting the first-type information with the increased weight and the second-type information with the decreased weight into the prediction model.

4. The method of claim 2, wherein the prediction model comprises at least one of: a convolutional neural network model or a recurrent neural network model.

5. The method of claim 1, wherein downloading the resource files of the target application comprises:
   obtaining a data amount of resource files that need to be downloaded for the target application;
   determining whether a triggering probability value of the target application is greater than a second preset probability value under a case that the data amount is greater than a preset data amount, the second preset probability value being greater than the first preset probability value;
   downloading all the resource files of the target application under a case that the triggering probability value of the target application is greater than the second preset probability value; and
   downloading part of the resource files of the target application under a case that the triggering probability value of the target application is not greater than the second preset probability value.

6. The method of claim 5, further comprising:
   adding an execution entrance of the target application to a main interface of the electronic device under the case that the triggering probability value of the target application is greater than the second preset probability value.

7. The method of claim 1, wherein downloading the resource files of the target application comprises:
   obtaining a pre-storage capacity corresponding to the target application based on the triggering probability value of the target application;
   obtaining a data amount of resource files that need to be downloaded for the target application;
   detecting whether the storage area has a residual capacity under a case that the data amount exceeds the pre-storage capacity;
   determining whether the data amount exceeds a sum of the pre-storage capacity and the residual capacity under a case that there is the residual capacity; and
   downloading the resource files of the target application under a case that the data amount does not exceed the sum of the pre-storage capacity and the residual capacity.

8. The method of claim 1, wherein there are a plurality of target applications and a plurality of alternative applications, and the second preset position is set around the first preset position.

9. The method of claim 1, wherein there are a plurality of target applications and a plurality of alternative applications, and the plurality of target applications and the plurality of alternative applications are displayed in an arrangement of the triggering probability values.

10. The method of claim 1, further comprising:
    updating the triggering probability value of the target application under a case that the storage area is full; and
    deleting the resource files of the target application under a case that the updated triggering probability value is smaller than the first preset probability value.

11. The method of claim 1, further comprising:
generating and displaying a native interface of the target application based on a configuration file of the target application included in the resource files.

12. The method of claim 11, wherein the configuration file comprises statements describing the native interface of the target application, and the statements comprise data required for displaying the native interface and an operation logic of the native interface.

13. A non-transitory computer-readable storage medium having a computer program stored thereon, wherein an electronic device is caused to execute a method for application processing when the computer program is executed by the electronic device, the method comprising:
obtaining historical operation information of the electronic device;
obtaining triggering probability values of a plurality of applications in an application platform installed in the electronic device based on the historical operation information;
selecting an application with a triggering probability value greater than a first preset probability value as a target application;
downloading resource files of the target application;
buffering the resource files into a storage area corresponding to the application platform;
loading the resource files stored in the storage area and corresponding to the target application, in response to detecting a triggering operation on the target application;
selecting an application with a triggering probability value not greater than the first preset probability value but greater than a third preset probability value as an alternative application, wherein the third preset probability value is smaller than the first preset probability value;
adding an execution entrance of the target application to a first preset position of a main interface of the application platform; and
adding an execution entrance of the alternative application to a second preset position of the main interface of the application platform.

14. An electronic device, comprising:
a processor; and
a memory, configured to store a computer program and coupled to the processor;
wherein the processor is configured to execute the computer program to perform actions of:
obtaining historical operation information of the electronic device;
obtaining triggering probability values of a plurality of applications in an application platform installed in the electronic device based on the historical operation information;
selecting an application with a triggering probability value greater than a first preset probability value as a target application;
downloading resource files of the target application;
buffering the resource files into a storage area corresponding to the application platform;
loading the resource files stored in the storage area and corresponding to the target application, in response to detecting a triggering operation on the target application;
selecting an application with a triggering probability value not greater than the first preset probability value but greater than a third preset probability value as an alternative application, wherein the third preset probability value is smaller than the first preset probability value;
adding an execution entrance of the target application to a first preset position of a main interface of the application platform; and
adding an execution entrance of the alternative application to a second preset position of the main interface of the application platform.

15. The device of claim 14, wherein the processor is configured to obtain the historical operation information of the electronic device, and obtain the triggering probability values of the plurality of applications in the application platform installed in the electronic device based on the historical operation information by actions of:
obtaining a triggering time point in response to detecting a triggering operation on the application platform;
obtaining historical operation information of the electronic device in a preset period prior to the triggering time point; and
inputting the historical operation information into a prediction model, the prediction model for predicting the triggering probability values of the plurality of applications in the application platform based on the historical operation information.

16. The device of claim 15, wherein the processor is configured to input the historical operation information into the prediction model by actions of:
classifying the historical operation information to obtain first-type information belonging to user interaction information and second-type information belonging to system information of the electronic device;
increasing a weight of the first-type information and decreasing a weight of the second-type information; and
inputting the first-type information with the increased weight and the second-type information with the decreased weight into the prediction model.

17. The device of claim 14, wherein the processor is configured to download the resource files of the target application by actions of:
obtaining a data amount of resource files that need to be downloaded for the target application;
determining whether a triggering probability value of the target application is greater than a second preset probability value under a case that the data amount is greater than a preset data amount, the second preset probability value being greater than the first preset probability value;
downloading all the resource files of the target application under a case that the triggering probability value of the target application is greater than the second preset probability value; and
downloading part of the resource files of the target application under a case that the triggering probability value of the target application is not greater than the second preset probability value.

18. The device of claim 14, wherein the processor is configured to download the resource files of the target application by actions of:
obtaining a pre-storage capacity corresponding to the target application based on the triggering probability value of the target application;
obtaining a data amount of resource files that need to be downloaded for the target application;

detecting whether the storage area has a residual capacity under a case that the data amount exceeds the pre-storage capacity;

determining whether the data amount exceeds a sum of the pre-storage capacity and the residual capacity under a case that there is the residual capacity; and downloading the resource files of the target application under a case that the data amount does not exceed the sum of the pre-storage capacity and the residual capacity.

* * * * *